United States Patent [19]
Takeshita et al.

[11] Patent Number: 5,849,058
[45] Date of Patent: Dec. 15, 1998

[54] REFINING METHOD FOR MOLTEN GLASS AND AN APPARATUS FOR REFINING MOLTEN GLASS

[75] Inventors: Shinji Takeshita; Chikao Tanaka; Kazuhiko Ishimura, all of Yokohama, Japan

[73] Assignee: Asahi Glass Company Ltd., Tokyo, Japan

[21] Appl. No.: 754,006

[22] Filed: Nov. 20, 1996

[30] Foreign Application Priority Data

Nov. 21, 1995 [JP] Japan .................................. 7-326361
Nov. 30, 1995 [JP] Japan .................................. 7-336102

[51] Int. Cl.⁶ .................................................. C03B 5/225
[52] U.S. Cl. .................... 65/134.2; 65/32.5; 65/134.9; 65/135.2; 65/135.3; 65/178; 65/346; 65/347
[58] Field of Search .................... 65/32.5, 134.2, 65/134.9, 135.2, 135.3, 178, 346, 347

[56] References Cited

U.S. PATENT DOCUMENTS

| | | | |
|---|---|---|---|
| 1,598,308 | 8/1926 | Pike | 65/134.2 |
| 3,321,300 | 5/1967 | Worner | 75/509 |
| 3,519,412 | 7/1970 | Olink | 65/337 |
| 4,994,099 | 2/1991 | Boettner | 65/134.2 |
| 5,316,563 | 5/1994 | Ishimura et al. | 65/32.5 |

FOREIGN PATENT DOCUMENTS

| | | |
|---|---|---|
| 0 556 576 | 1/1993 | European Pat. Off. . |
| 2-221129 | 9/1990 | Japan . |
| 3-33020 | 2/1991 | Japan . |
| 3-69516 | 3/1991 | Japan . |
| 4-31325 | 2/1992 | Japan . |
| 5-58646 | 3/1993 | Japan . |
| 5-208830 | 8/1993 | Japan . |
| 5-208845 | 8/1993 | Japan . |
| 5-229831 | 9/1993 | Japan . |
| 6-305735 | 11/1994 | Japan . |

OTHER PUBLICATIONS

Proceedings of the XVI International Congress on Glass—Oct. 4–9 1992, vol. 6, pp. 173–178, S. Takeshita, et al., "Refining of Glasses Under Subatmospheric Pressures".

Primary Examiner—Stanley S. Silverman
Assistant Examiner—Sean Vincent
Attorney, Agent, or Firm—Oblon, Spivak, McClelland, Maier & Neustadt, P.C.

[57] ABSTRACT

A refining method for molten glass comprising a stirring step for stirring molten glass in a stirring vessel, a feeding step for feeding the molten glass into a vacuum vessel via an uprising pipe, a degassing step wherein the molten glass is put under a reduced pressure in the vacuum vessel, bubbles produced on the molten glass surface and a flow of the molten glass just below the molten glass surface are blocked by a barrier provided in the vacuum vessel, and the molten glass is degassed in a state that a bubble layer is formed on the molten glass surface, and a discharging step for discharging the molten glass after degassing from the vacuum vessel through a downfalling pipe to a storage vessel.

9 Claims, 2 Drawing Sheets

REFINING METHOD FOR MOLTEN GLASS AND AN APPARATUS FOR REFINING MOLTEN GLASS

The present invention relates to a refining method for molten glass to remove bubbles in the molten glass and an apparatus for carrying out the method.

A refining step for refining molten glass is generally conducted by adding previously a suitable refiner. As a typical example of the refiner, Glauber's salt is used. The Glauber's salt decomposes itself at a refining temperature and produces bubbles of $SO_2$, which provides mainly a refining effect. When a glass material, which is too high in viscosity at a decomposition temperature of Glauber's salt to refine the molten glass by the Glauber's salt, is used, a refiner having a higher decomposition temperature such as $As_2O_3$ or $Sb_2O_3$ is used. However, when $As_2O_3$ or $Sb_2O_3$ is used for a floating method, it reacts with tin in a floating bath to cause an adverse effect. Accordingly, it is unsuitable for forming a glass product by the floating method.

For the purpose of refining a glass material having a high viscosity at a high temperature, there is proposed a vacuum degassing method, a typical example of which is disclosed in Japanese Unexamined Publication JP-A-62-235222. Although the proposed vacuum degassing method provides an excellent refining effect because a molten glass material is introduced into a vacuum vessel which is kept below the atmospheric pressure, it is not always suitable for the glass material including a volatile compound such as $B_2O_3$ because the volatile compound vaporizes during the refining step.

The inventors of this application proposed a vacuum degassing apparatus utilizing a siphon system. The proposed apparatus has an excellent feature of suppressing the vaporization of the volatile compound in the refining step because the molten glass surface subjected to a reduced pressure is limited only to the surface of the glass material. As techniques for conducting degassing under a reduced pressure by utilizing the siphon system and techniques obtained by improving the techniques, there are publications such as Japanese Unexamined Patent Publication JP-A-3-69516, JP-A-2-188430, JP-A-2-221129, JP-A-4-31325, JP-A-3-33020, JP-A-5-58646, JP-A-5-208845, JP-A-5-229831, JP-A-6-305735 and JP-A-5-208830.

The publication disclosed in Japanese Unexamined Patent Publication JP-A-3-33020, as an example, employs such a system that molten glass is lead to a forming step through a melting vessel, an uprising pipe, a vacuum degassing vessel, a downfalling pipe and a storage vessel in this order, wherein a change of deformation of a flexible sealing material, which surrounds the uprising pipe and the downfalling pipe in a steady state of expansion, is controlled. The proposed apparatus basically utilizes a siphon principle, so that the molten glass is introduced from the melting vessel to the vacuum degassing vessel in which bubbles are removed to obtain homogeneous molten glass, whereby a glass product of high homogeneousness is obtained by forming.

FIG. 4 is a schematic diagram showing an example of an apparatus for making a glass product in which the above-mentioned vacuum degassing apparatus of siphon system is used. In FIG. 4, reference numeral 31 designates a storage vessel, numeral 32 designates an uprising pipe, numeral 33 designates a vacuum degassing vessel, numeral 34 designates a downfalling pipe and numeral 35 designates a storage vessel. The uprising pipe 32, the vacuum degassing vessel 33 and the downfalling pipe 34 are received in a casing 36, and a thermal insulating material 37 packed in the casing 36 prevents heat dissipation and insulates heat with respect to outer air. Further, the uprising pipe 32, the vacuum degassing vessel 33 and the downfalling pipe 34 are heated by a suitable heating means such as an electric heater (not shown), and a temperature controlling system (not shown) maintains temperature to a predetermined range, e.g., about 1,200° C. to 1,450° C. In FIG. 4, an arrow mark indicates a direction of flowing the molten glass. Numeral 38 designates a bypass pipe for the molten glass, which is opened and closed by a gate means 39.

In the glass producing apparatus having the construction described above, a flow of the molten glass in the uprising pipe 32, the vacuum degassing vessel 33 and the downfalling pipe 34 follows the siphon principle. Accordingly, the liquid surface of the molten glass in the storage vessel 35 is lower than the liquid surface of the molten glass in the storage vessel 31, and inside of the vacuum degassing vessel 33 is in a state of reduced pressure by a difference of head. In this case, the height of the vacuum degassing vessel 33 is determined to maintain the liquid surface L to a predetermined value depending on a flow quantity of the molten glass previously set (which corresponds to a production rate for a glass product previously determined), conditions for refining and so on. Thus, a space S for breaking bubbles is formed above the molten glass surface in the vacuum degassing vessel 33.

The molten glass which contains bubbles produced during melting is fed to a lower end portion of the uprising pipe 32; rises in it, and is introduced to the vacuum degassing vessel 33. Since the inside of the vacuum degassing vessel 33 is set to a reduced pressure such as 1/20 to 1/3 atmospheric pressure, the molten glass introduced to the vacuum degassing vessel 33 by ascending in the uprising pipe 32 is subjected to degassing under a reduced pressure in the vacuum degassing vessel 33 whereby the bubbles contained in the molten glass are removed.

Thus, dissolved gas is removed by maintaining the inner pressure of the vacuum degassing vessel 33 to a predetermined reduced pressure. Then, the molten glass thus refined descends in the downfalling pipe 34 from the vacuum degassing vessel 33 while keeping such state and is introduced into the storage vessel 35 where the molten glass is homogenized by a stirring operation which is generally conducted. The molten glass in a degassing state in the vacuum degassing vessel 33 includes no bubbles, and the density of dissolved gas is decreased. The molten glass is supplied to a forming step in a homogenized state and formed into a desired shape for various glass products.

In the above-mentioned vacuum degassing apparatus utilizing the siphon system, when volatile compounds vaporized from the molten glass surface, there causes a difference of composition between the surface area and the inside of the glass material (the molten glass). When the difference is large, cords are formed in glass products. Even when the difference is not so large, the quality of glass products is decreased due to striation (as disclosed in Japanese Unexamined Patent Publication JP-A-2-188430). To eliminate such disadvantage, Japanese Unexamined Patent Publication JP-A-5-208830 proposes to conduct a fairly strong stirring of glass material after degassing in order to homogenize the material.

However, the proposed technique to stir glass material can not be carried out to all kinds of glass materials. When a glass material having a low ability of dissolving gas in the molten glass (hereinbelow, sometimes referred to as melt) is used, a reboiling occurs even by a slight stirring operation whereby bubbles are produced.

It is an object of the present invention to eliminate the disadvantage in the conventional technique and to provide a refining method and a refining apparatus which are applicable to various kinds of glass material and realizes high degree of refining and homogenization simultaneously.

Namely, it is an object of the present invention to provide a refining method and a refining apparatus for molten glass in which a vacuum vessel utilizing a siphon system is used in a refining step for the molten glass wherein a flow of the molten glass is suitably controlled by a bubble layer and a barrier in the vacuum vessel to prevent a change of the composition of the glass material whereby yield for glass products can be remarkably improved without causing a change of glass composition till a forming step, and the glass products of homogeneous quality can be obtained.

In accordance with the present invention, there is provided a refining method for molten glass comprising a stirring step for stirring molten glass in a stirring vessel, a feeding step for feeding the molten glass into a vacuum vessel via an uprising pipe, a degassing step wherein the molten glass is put under a reduced pressure in the vacuum vessel, bubbles produced on the molten glass surface and a flow of the molten glass just below the molten glass surface are blocked by a barrier provided in the vacuum vessel, and the molten glass is degassed in a state that a bubbles layer is formed on the molten glass surface, and a discharging step for discharging the molten glass after degassing from the vacuum vessel through a downfalling pipe to a storage vessel.

Further, in accordance with the present invention, there is provided a refining apparatus for molten glass comprising a stirring vessel for stirring molten glass, a vacuum vessel which is communicated with the stirring vessel via an uprising pipe and which includes therein a barrier for blocking bubbles produced on the molten glass surface and a flow of the molten glass just below the molten glass surface whereby the molten glass is degassed, under a reduced pressure, in a state that a bubble layer is formed on the molten glass surface, and a storage vessel connected to the vacuum vessel via a downfalling pipe to receive the molten glass after degassing.

In the present invention, stirring is conducted in a stirring vessel placed at a front stage whereby dissolved gas is formed to be fine bubbles so that ununiformity of glass material which is caused in a melting operation is at least eliminated. The stirring vessel may serve as a melting vessel. The fine bubbles become large in a vacuum vessel; come up taking the dissolved gas, and escape to the space above the molten glass surface.

In the present invention, a barrier is placed to form a bubble layer on the molten glass surface. The barrier controls convection in the glass material in association with the bubble layer whereby homogeneousness of the glass material in the vacuum vessel can be improved.

In conventional techniques, there has been considered that the homogeneousness of the glass material is decreased by the vaporization of volatile compounds such as $B_2O_3$ and so on of the glass material in the vacuum degassing vessel (Japanese Unexamined Patent Publication JP-A-2-188430 and JP-A-5-208830). To the contrary, according to the present invention, the homogeneousness of the glass material can be improved in the vacuum vessel although the reason is unclear. However, it can be considered as follows. The use of the barrier to form the bubble layer may cause ununiformity of the melt due to the vaporization of volatile compounds in a portion of the melt which contacts with the vacuum atmosphere in the vacuum vessel. However, the homogeneousness is improved by the stirring effect due to raising of bubbles inside of the melt, and the mixing of two kinds of melt is suppressed by the presence of the bubble layer and the barrier.

Namely, when the barrier is located in the vacuum vessel according to the present invention, the barrier is immersed in the melt. Accordingly, it functions not only to block the bubble layer on the surface of the melt but also block a flow of the melt at its surface portion. The later produces a slow flow of the melt in the surface portion, namely, it produces a stagnant state of flow. Accordingly, the melt in its surface portion is prevented from moving along the side walls or the like of the vacuum vessel. Further, the presence of the barrier forms the bubble layer at its front side. The bubble layer prevents convection in the surface portion or the inside of the melt because of the buoyance of the bubbles or the compression force of the bubbles which are in contact with the melt surface.

On the other hand, there forms a portion without having the bubble layer at the rear side of the barrier. Since bubbles are not substantially formed there, there is no risk of invasion of bubbles into the downfalling pipe, whereby the homogeneousness of the composition of the molten glass and a glass product formed by the molten glass can be improved.

According to the present invention, the provision of a homogenizing means such as a stirring member is substantially unnecessary in the rear side of the vacuum vessel owing to the barrier and the bubble layer because the dissolved gas is formed into fine bubbles or ununiformity of the glass material resulted in the melting operation is at least eliminated in the stirring vessel located at the front stage. However, a supplementary stirring operation may be added depending on requirements.

In the above, description has been made as to how to utilize the barrier and the bubble layer formed by the barrier. As the premise of providing these, it is necessary to discuss about the formation of an appropriate bubble layer. Further, it is necessary to discuss about conditions of forming and maintaining the bubble layer in which bubbles in the bubble layer are not easily broken at the melt surface. Namely, it is necessary to suitably control the viscosity of the melt. The formation of the bubbles can be controlled by adjusting a quantity of a component or components such as $SO_3$ or cl which vaporize at a refining temperature or slightly higher in an ordinary glass batch. Further, it necessary to determine the viscosity of the melt to be $\log\eta=2.6$ or higher in a case of using the ordinary glass material. However, it can be suitably determined for each batch depending on the composition of molten glass used.

BRIEF DESCRIPTION OF THE DRAWINGS

FIG. 2a is an enlarged schematic view of a portion indicated by A in FIG. 1;

FIG. 2b is a perspective view schematically shown of the portion taken along a B–B' line in FIG. 2a;

In the following, embodiments of the refining method and the refining apparatus for glass products according to the present invention will be described with reference to the drawings. However, the present invention is not limited only to the embodiments.

Figure 1:
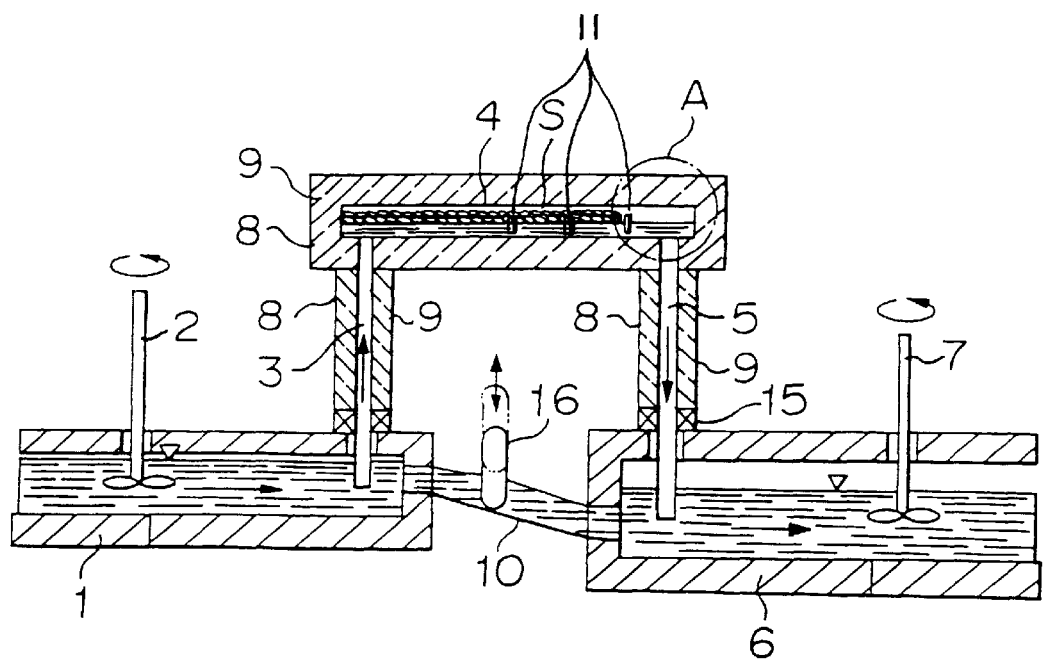
FIG. 1 is a schematic diagram in cross-section for explaining an embodiment of a refining apparatus for molten glass according to the present invention.
Figure 2:
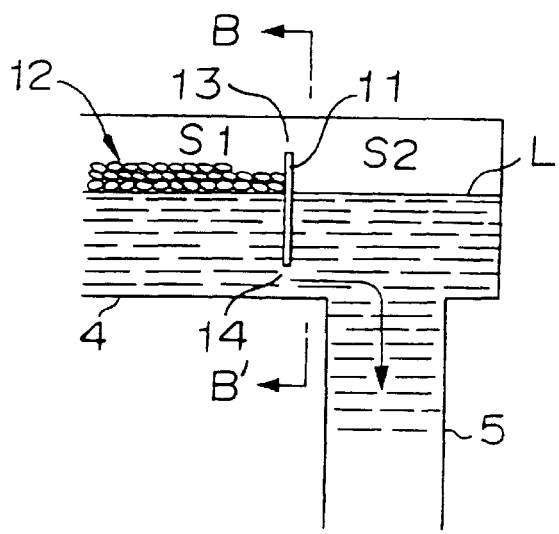
Figure 2:
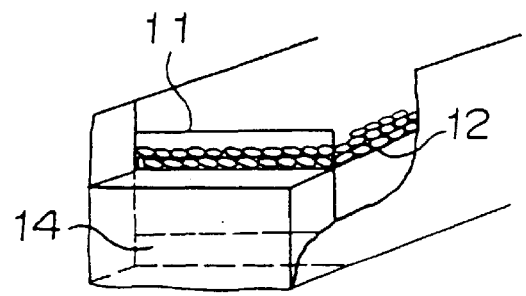

Referring to FIGS. 1 and 2, reference numeral 1 designates a stirring vessel in a refining apparatus. A first stirrer 2 is provided in the stirring vessel 1 so as to be supported in freely rotatable. The refining apparatus further comprises an uprising pipe 3 for molten glass, a vacuum vessel 4, a downfalling pipe 5 and a storage vessel 6. A second stirrer 7 is provided in the storage vessel 6. The uprising pipe 3, the vacuum vessel 4 and the downfalling pipe 5 are received in a casing 8. A thermal insulating material 9 is received in the casing 8 to prevent heat dissipation and provides heat insulation to outer air. The uprising pipe 3, the vacuum vessel 4 and the downfalling pipe 5 are heated by an electric heating device or the like (not shown). A temperature controlling system is provided to maintain temperature to a predetermined temperature, e.g., 1,200° C. to 1,450° C. In FIGS. 1 and 2, arrow marks indicate the flow of the molten glass. Numeral 10 designates a bypass pipe for molten glass, which is opened or closed by a gate means 16.

In FIG. 2a which is an enlarged view of a portion indicated by A in FIG. 1 and FIG. 2b which is a perspective view of a portion taken along a B–B' line in FIG. 2a, the same reference numerals are used for portions commonly used in FIG. 1. Reference numeral 12 designates a bubble layer which is formed by blocking bubbles by a barrier 11. In FIG. 2, the barrier 11 is shown as a single. However, two or more barriers 11 may be positioned in the longitudinal direction (see FIG. 1) with suitable intervals to form the bubble layer in a more reliable manner.

A space S in the vacuum vessel 4 comprises a portion S1 having the bubble layer on the molten glass surface at the upstream side of the barrier 11 and a portion S2 without having the bubble layer on the molten glass surface at the downstream side of the barrier 11. The portion S1 having the bubble layer provides a stagnant state of the melt at its surface portion whereby the downward movement of the melt along the side walls of the vacuum vessel becomes slow. Further, the presence of the bubble layer prevents the formation of convection at the surface area or the inside of the melt due to the buoyance or the pressing force of the bubbles in contact with the melt surface.

The operation and effect of the refining apparatus having the above-mentioned construction will be described. The molten glass which has been molten in a melting vessel (not shown) and stored in the stirring vessel 1 is stirred by the first stirrer 2 whereby dissolved gas is transformed into fine bubbles or ununiformity of glass material resulted in the melting operation is eliminated. The flow of the molten glass to the uprising pipe, the vacuum vessel and the downfalling pipe is according to the siphon principle. Accordingly, the liquid surface of the molten glass in the storage vessel 6 is lower than the liquid surface of the molten glass in the stirring vessel 1, and the inside of the vacuum vessel 4 is kept in a state of reduced pressure due to a difference of head. In the vacuum vessel 4, the molten glass flows to the downfalling pipe while the liquid surface L and the space S are maintained.

The molten glass contains dissolved gas. However, the dissolved gas is dissolved in a gaseous state in the molten glass when it is subjected to the ordinary pressure. In the present invention, it is indispensable to stir the molten glass before the vacuum vessel 4, and the first stirrer 2 performs such function in the apparatus as shown. When the stirring operation is conducted, dissolved gas is transformed into fine bubbles, and ununiformity of glass material resulted when the raw material is molten, is corrected. The stirring should be conducted to such an extent that a bubble layer (which is to be formed by the barrier 11) having a thickness of 10 mm or more is formed in the vacuum vessel 4. However, the bubble layer should not be discharged to the outside of the vessel. In this case, the viscosity and temperature of the molten glass can be suitably determined depending on the composition of the molten glass and so on. Generally, a viscosity of about $\log\eta=2.7$–$4.2$ and a temperature of about 1,450° to 1,200° C. are used. The molten glass containing fine bubbles is lead to a lower end portion of the uprising pipe 3; ascends in the uprising pipe 3 according to the siphon principle, and is introduced into the vacuum vessel 4. The inside of the vacuum vessel 4 is brought to a reduced pressure condition of less than the atmospheric pressure, for instance, $\frac{1}{20}$ to $\frac{1}{3}$ atmospheric pressure. The fine bubbles in the molten glass which has been lead into the vacuum vessel 4 through the uprising pipe are reboiled at an initial stage to form the bubble layer on the molten glass surface. Observation on various conditions has revealed that bubbles are not substantially produced in the vacuum vessel after the bubble layer has been once formed.

The barrier 11 can be placed at an appropriate position in the vacuum vessel 4. When it is located at a position around the center of the vacuum vessel or in front of the center, i.e. at the side of the uprising pipe 3, a bubble layer may appear even in the portion S2. Further, in order to block the flow of the melt, it is desirable to locate the barrier 11 at the downstream side (in the vicinity of the downfalling pipe 5) of the vacuum vessel 4 where bubbles are not substantially produced. When the bubbles are not produced, the stirring effect is lost. Further, the barrier located near the downfalling pipe 5 provides a high performance of blocking the flow of the melt. Accordingly, when a plurality of barriers are provided, it is preferable to locate at least one of them at a position near the downfalling pipe 5 in the vacuum vessel 4.

When two or more number of barriers 11 are used, they are located with appropriate intervals. In this case, at least one barrier should be located in consideration of the above-mentioned, and the other barriers may be located appropriate positions, for instance, the center portion, the front or rear of the center portion. When a plurality of barriers were located in the vacuum degassing vessel 4 to form first, second and third vessel sections in this order from the left of the vessel in FIG. 1 and the formation of bubble layers was observed, the thickness of the bubble layer in the first vessel section was 100 mm or more, while a bubble layer could not substantially be observed in the third vessel section. In consideration that there is substantially no bubble layer in the third vessel section, it is preferable that the third vessel section should have the minimum surface area which allows to observe the level of molten glass. The depth of the barrier or barriers immersed in the melt should be 30 mm or more, more preferably, 50 mm or more to provide an effective function.

In the portion S2 at the downstream side of the barrier 11 in FIG. 1, there is no bubble layer on the molten glass surface. Accordingly, the molten glass near the downfalling pipe 5 does not contain bubbles and bubbles are not mixed into the molten glass flowing in the downfalling pipe 5. Thus, since any bubble layer is not formed on the molten glass surface in the portion S2, it is possible to measure correctly the surface level of the molten glass there. As mentioned before, it is preferable that the measuring portion has the minimum surface area to observe the level of the molten glass.

As shown in FIG. 2, the barrier 11 is fixed in the vacuum vessel 4 in such a manner that predetermined gaps 13, 14 are provided at the upper and lower portions with respect to the liquid surface of the molten glass. The lower gap 14 forms the flow passage for flowing the molten glass. The shape of the barrier 11 may be an appropriate form such as a thin plate-like form as far as it has a width traversing the width of the vacuum vessel 4 and the above-mentioned predetermined gaps 13, 14 are provided at the upper and lower portions of the vacuum vessel. Material for forming the barrier 11 is preferably platinum or a platinum-rhodium alloy.

Then, the molten glass descends in the downfalling pipe 5 in the above-mentioned state and is introduced into the storage vessel 6 where it is subjected to supplementary stirring with the second stirrer 7 in the storage vessel 6 so as to be homogenized. In the present invention, however, the second stirrer 7 is not always necessary, and it is located for supplemental purpose in this embodiment. In the present invention as described before, vaporization of volatile components such as boric acid and the like from the mother glass (the molten glass) to the gaseous phase is controlled by the bubble layer. Accordingly, the molten glass is homogenized in terms of composition and is fed to a shaping step whereby various kinds of glass product of high homogeneousness are produced.

In a conventional vacuum degassing apparatus utilizing the siphon principle, when there is a change of flow rate or temperature of the flowing molten glass, there occurs a change in a degree of vacuum or the level of the molten glass (the depth of the material) or the like in the vacuum degassing vessel 3. Accordingly, the conventional vacuum degassing apparatus encountered problems that it was necessary to recover the normal state by correcting the change whenever occurred. Further, it was difficult to cope with a change of conditions for producing glass sheets.

In order to eliminate such problem, the position in height of the vacuum degassing vessel is changed in the embodiment shown in FIG. 1, so that the condition for breaking bubbles in the molten glass in the vacuum degassing vessel is kept constant. Namely, the level in the vertical direction of the vacuum degassing vessel can be changed as desired with an elevating device.

According to the embodiment shown in FIG. 1, when the inner pressure of the vacuum degassing vessel is to change by 100 mmHg with respect to molten glass having the same composition, a distance of vertical movement of about 500 mm is taken. The distance of vertical movement can be selected by determining conditions for reducing pressure for each composition of molten glass to be treated in laboratory tests. When the elevating device, which may be a jack or a set of jacks, are operated to vertically move the uprising pipe, the vacuum degassing vessel and the downfalling pipe, a gap is produced at the lower end portion of the casing 8 which surrounds the uprising pipe and the downfalling pipe. In this case, the gap is filled by setting a warm keeping material 15 or a heating source depending on the length of the gap formed at the lower end of the casing.

FIG. 3 is a diagram showing an embodiment of the vacuum degassing apparatus shown in FIG. 1 wherein a set of jacks as an example of the elevating device are attached to the apparatus.

A degree of vacuum in the vacuum degassing vessel 4 is in proportion to the height with respect to the liquid surface of the molten glass in the storage vessel 1 and the storage vessel 6. Accordingly, in the conventional technique, the height was determined in correspondence to a previously determined flow rate of the molten glass (the flow rate corresponds to a production rate of glass products). However, when there is a change in the temperature of the molten glass flowing in the apparatus or a production rate of glass products, there causes a change in the depth of glass material in the vacuum degassing vessel and so on. Accordingly, it was necessary to recover it to the normal condition by correcting the change. In this embodiment of the present invention, such change can be absorbed by using the elevating device attached to the vacuum degassing vessel 4 to recover the normal condition.

Figure 3A:
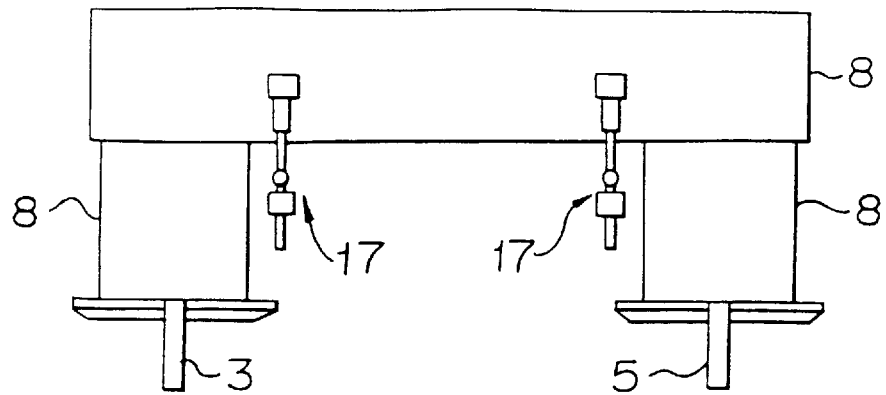
FIGS. 3a and 3b are schematic views of a part of 15 the refining apparatus shown in FIG. 1 wherein jacks, as an example of elevating device, are attached to the apparatus.
Figure 3B:
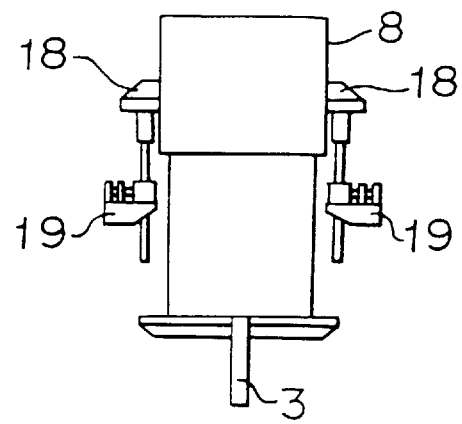
Figure 4:
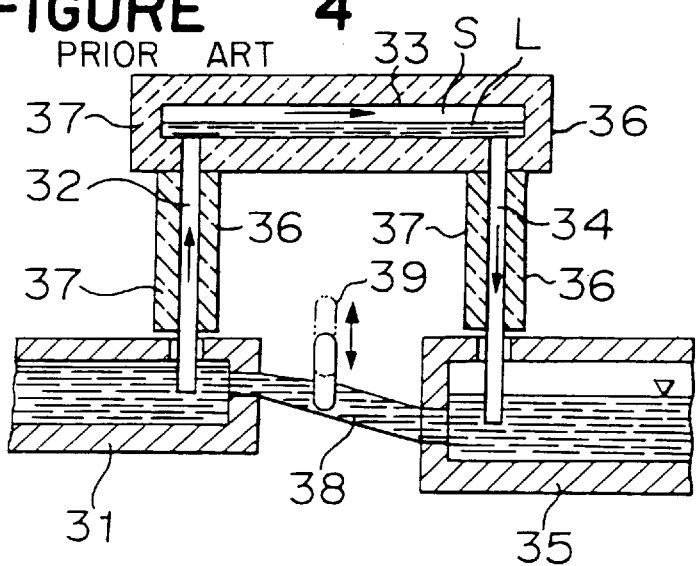
FIG. 4 is a schematic view of a conventional refining apparatus utilizing a siphon system.

FIG. 3a and 3b show an embodiment using jacks as an example of the elevating device wherein FIG. 3a is a front view and FIG. 3b is a side view. As shown in FIG. 3, each two jacks are provided at each side in the longitudinal direction of the casing 8 for the vacuum degassing vessel 4, hence, there are four jacks 17 in total. Numeral 18 designates a fixing part for attaching the jack 17 to the casing 8, and numeral 19 designates a leg portion for the jack 17, which is mounted on and fixed to an appropriate base portion. In FIG. 3, screw jacks are used. However, oil pressure jacks, rack-driving jacks or any other devices may be used.

In such refining apparatus for molten glass, when the flow rate of the molten glass is reduced from the normal state for instance, the molten glass surface in the vacuum degassing vessel 4 increases (i.e., the depth of the material becomes large) with the result that the space S for breaking bubbles becomes relatively small. Then, the degree of removing bubbles in the vacuum degassing vessel 4 changes whereby the quality of the molten glass changes. In order to avoid such disadvantage, it is necessary to correct the depth of the material and the space S to be a fixed value. In this case, when the vacuum degassing vessel 4 is elevated by operating the jacks, the molten glass surface in the vacuum degassing vessel falls relatively due to the gravity action, whereby the space S for breaking bubbles becomes relatively large to recover the normal condition.

When the vacuum degassing vessel 4 is raised by operating the jacks, the casings 8 surrounding the uprising pipe 2 and the downfalling pipe 5 are also raised along with the vessel 4 whereby gaps are formed between the lower end portions of the casings 8 and the upper surface of the storage vessels 1 and 6. In this case, warm keeping members or heat sources are set to the gaps depending on the length of the gaps. In FIG. 1, numeral 15 designates the warm keeping member or the heat source.

Aluminosilicate glass including boric acid having high viscosity at high temperature was treated with use of the apparatus shown in FIG. 1. Two barriers 11 were positioned: one at the center of the vacuum vessel 4 and the other at a ¼ position on the downstream side. The depth of immersion of the barriers was 65 mm (a depth of immersion of 30 mm or more, preferably 50 mm or more is effective). For stirring, the first stirrer 2 is rotated at about 5 rpm and the second stirrer 7 is rotated at about 3 rpm or lower. As a result, there was found the number of bubbles of 0.1–0.2 number/kg or lower in glass products shaped from the molten glass. Thus, glass plates of better homogeneousness (less striation) could be obtained.

According to the present invention, a barrier is provided in the vacuum vessel to form a bubble layer on the molten glass surface. Accordingly, a high degree of refining and a high degree of homogeneousness can simultaneously be realized even when various kinds of glass material are used. Further, the surface level of the molten glass can be measured in a space at the downstream side of the vacuum vessel, and a homogenizing means which was provided after the vacuum vessel in the conventional technique is no longer necessary.

Further, the vertical position of the vacuum degassing vessel can be changed as desired with an elevating device. Accordingly, conditions for making glass plates can easily be changed without changing conditions for refining such as pressure, temperature, the depth of glass material in the vacuum degassing apparatus. Further, when conditions for refining in the vacuum degassing apparatus are to be changed due to a problem concerning the quality of glass products, the vacuum degassing apparatus is vertically moved as well.

We claim:

1. A refining method for molten glass comprising:

a stirring step for stirring molten glass in a stirring vessel;

a feeding step for feeding the molten glass into a vacuum vessel via an uprising pipe;

a degassing step wherein the molten glass is put under a reduced pressure in the vacuum vessel, and the molten glass is degassed in a state that a bubble layer is formed on a molten glass surface, the vacuum vessel being provided with a barrier having a width traversing an entire width of the vacuum vessel at a side of said downfalling pipe with respect to a center of the vacuum vessel, said barrier blocking bubbles produced on the molten glass surface and a flow of the molten glass just below the molten glass surface during said degassing step; and a discharging step for discharging the molten glass after degassing from the vacuum vessel through a downfalling pipe to a storage vessel.

2. The refining method for molten glass according to claim 1, wherein a plurality of barriers are provided to block the bubbles produced on the molten glass surface and the flow of the molten glass just below the molten glass surface.

3. The refining method for molten glass according to claim 1, wherein the thickness of the bubble layer formed on the molten glass surface in the vacuum vessel is 10 mm or more.

4. The refining method for molten glass according to claim 1, wherein the bubble layer is not substantially formed on the molten glass surface at a downfalling pipe side with respect to the barrier.

5. The refining method for molten glass according to claim 1, wherein a pressure inside the vacuum vessel is $1/20$ to $1/3$ atmospheric pressure.

6. A refining apparatus for molten glass comprising:

a stirring vessel for stirring molten glass;

a vacuum vessel which is communicated with the stirring vessel via an uprising pipe;

a storage vessel connected to the vacuum vessel via a downfalling pipe to receive the molten glass after degassing; and a barrier provided in the vacuum vessel and having a width traversing an entire width of the vacuum vessel at a side of said downfalling pipe with respect to a center of the vacuum vessel, said barrier blocking bubbles produced on a molten glass surface and a flow of the molten glass just below the molten glass surface whereby the molten glass is degassed, under a reduced pressure, in a state that a bubble layer is formed on the molten glass surface.

7. The refining apparatus for molten glass according to claim 6, wherein a barrier is provided in the vacuum vessel so that the barrier intersects the molten glass surface, and a space is formed at its lower portion so as to pass the molten glass.

8. The refining apparatus for molten glass according to claim 6, wherein a plurality of barriers are provided.

9. The refining apparatus for molten glass according to claim 6, wherein the barrier is immersed in the molten glass at a depth of 30 mm or more.

* * * * *